United States Patent [19]

Gilch et al.

[11] Patent Number: 4,661,542
[45] Date of Patent: Apr. 28, 1987

[54] ADHESIVE COMPOSITIONS

[75] Inventors: Heinz Gilch; Hubertus von Voithenberg, both of Bad Homburg; Reinhard Rengel, Bad Soden, all of Fed. Rep. of Germany

[73] Assignee: USM Corporation, Farmington, Conn.

[21] Appl. No.: 823,666

[22] Filed: Jan. 29, 1986

[30] Foreign Application Priority Data

Feb. 12, 1985 [GB] United Kingdom ............... 8503561

[51] Int. Cl.$^4$ ............................................. C08G 18/10
[52] U.S. Cl. ........................................ 524/59; 524/81; 524/157; 524/296; 524/297; 524/705; 524/745; 524/764; 524/775; 528/49; 528/59; 528/76; 528/77
[58] Field of Search ............... 524/59, 157, 296, 297, 524/705, 745, 81, 764, 775; 528/49, 59, 76, 77

[56] References Cited

U.S. PATENT DOCUMENTS

| | | | |
|---|---|---|---|
| 3,437,622 | 4/1969 | Dahl | 260/24 |
| 3,767,040 | 10/1973 | Tushaus | 206/59 C |
| 3,933,725 | 1/1976 | Dearlove et al. | 260/33.6 |

FOREIGN PATENT DOCUMENTS

| | | |
|---|---|---|
| 0103453 | 3/1984 | European Pat. Off. . |
| 3416773 | 11/1984 | Fed. Rep. of Germany . |
| 1447017 | 6/1966 | France . |
| 2366348 | 4/1978 | France . |
| 1311211 | 3/1973 | United Kingdom . |
| 1320949 | 6/1973 | United Kingdom . |
| 1336842 | 11/1973 | United Kingdom . |
| 1531414 | 11/1978 | United Kingdom . |
| 1531413 | 11/1978 | United Kingdom . |
| 2085902 | 5/1982 | United Kingdom . |

Primary Examiner—Maurice J. Welsh
Attorney, Agent, or Firm—Thomas S. Szatkowski

[57] ABSTRACT

Pressure-sensitive adhesives which are mixed immediately prior to application, or need drying equipment tend to be expensive in use while those applied as hot melts tend to have poor heat resistance. According to the invention an adhesive composition curable by atmospheric moisture is provided, the composition comprising a prepolymer component with isocyanate functionality between 2.0 and 3.0 together with one or more polyetherurethane prepolymers having NCO groups available for reaction with water for chain extension, the cured adhesive composition having a glass transition temperature below 20° C.

18 Claims, No Drawings

ADHESIVE COMPOSITIONS

BACKGROUND OF THE INVENTION

The present invention is concerned with adhesive compositions.

Adhesive compositions having prolonged tackiness and bonding properties i.e. so called pressure-sensitive adhesives, are used for a variety of purposes. By the expression "pressure-sensitive adhesive" where used herein is meant an adhesive composition which can be applied to a substrate to provide a layer which has tacky characteristics which are preserved over a wide range of temperatures i.e. at least $-20°$ C. to $50°$ C. for a period of time in excess of 3 months, and which layer is capable of forming a bond to a surface by the application of light pressure alone. Known uses for pressure-sensitive adhesives include provision of permanently tacky coatings on tapes for various uses, coatings for labels, decorative elements, wall coverings and sheet materials of various types.

Pressure-sensitive adhesive compositions are formulated to provide compositions having a certain minimum balance of physical and chemical properties so as to be able to withstand the stresses and environment that the product will encounter and be expected to survive in use. The physical properties known in the art as tack, peel adhesion, and shear adhesion (otherwise referred to as holding power) are important in determining the suitability of any given pressure-sensitive adhesive composition to provide the necessary application properties and in-service durability required of the pressure-sensitive adhesive product.

The first property, tack, is in effect the instantaneous adhesion of the adhesive layer to a surface of an object that is developed immediately after contacting the surface with the layer. One accepted method of measuring tack, endorsed by the Pressure Sensitive Tape Council (USA), is test method PSTC-6 evolved and published as a standard test by the Council. It involves rolling a stainless steel ball down an inclined plane onto the surface of a pressure-sensitive adhesive layer deposited on a horizontal plane, and measuring the distance the ball rolls across the adhesive. In this test, tack is expressed in distance of ball travel. Thus high tack adhesive stops the ball within 0.5 to 3 inches (about 1.27 to 7.6 cm), whereas low tack adhesives allow the ball to roll more than 12 inches (about 30.3 cm).

The second property, peel adhesion, is the adhesion of the pressure-sensitive adhesive product after the adhesive layer has been in contact with an adherent surface for a sufficient period of time to reach a steady state or equilibrium with the surface. It is normally measured as the force required to remove a pressure-sensitive tape from a panel or its own backing at a specified angle and speed. PSTC-1 specifies one standard test method.

The third physical property utilised to define the suitability of a pressure-sensitive adhesive product for a given use is its shear adhesion. This test measures in essence the durability and permanence of the adhesive bond to a surface when subjected to a constant force, in the direction of the surface. PSTC-7 specifies one standard test method.

Besides these physical property parameters, the chemical attributes of the pressure-sensitive adhesive composition must also be considered in order to provide a pressure-sensitive adhesive product having the requisite durability in the environment in which it is to be used. Thus, for example, the pressure-sensitive adhesive must be formulated so as to exhibit resistance to adhesive-degrading environmental conditions such as elevated temperatures, sunlight, organic solvents, moisture, acids, and bases to which the pressure-sensitive adhesive product will be exposed in service.

Various polymeric materials have been used as a basis for pressure-sensitive adhesives, including natural rubber, styrene butadiene copolymers, acrylate copolymers and polyurethanes. Generally speaking the acrylate copolymers are the most frequently preferred materials for pressure-sensitive adhesives in view of their excellent ageing resistance, light stability, adhesion to a wide range of substrates, and due to the provision of a variety of acrylate copolymers to give various blends of tack, cohesion and adhesive properties.

Whilst acrylate copolymer based pressure-sensitive adhesives are available in a variety of forms (i.e. as solutions, emulsions and even hot melts) having a variety of properties, the use of those adhesives which are required to cure after application through use of curing agents or require use of quantities of energy to dry or cure them after application tends to be comparatively expensive. Also, those materials intended for application as hot melts tend to have comparatively low heat resistance properties.

Various proposals have been made to employ polyurethanes as the polymer basis for pressure-sensitive adhesives, but frequently these have employed two-component systems which require mixing before application, or blocked isocyanates which require significant heating to liberate the isocyanate, or less commonly available raw materials.

U.S. Pat. No. 3,437,622 discloses polyurethane based pressure-sensitive adhesives made from commonly available urethane raw materials, and optionally tackifying resin or plasticiser. The polyurethanes disclosed are made from aromatic diisocyanates and diols of hydroxyl number between about 56 and about 265 and triols of hydroxyl number between about 28 and about 56. The specification describes the use of these materials as solutions in organic solvent, and the use of heated circulating air ovens heated to temperatures of 100° C. or more for completion of the formation of the desired polyurethane and removal of the solvent. However, the ability of adhesives taught in U.S. Pat. No. 3,437,622 to provide a desired balance of tack, peel adhesion, creep resistance and environmental resistance has been questioned, and further formulations proposed. See for example U.S. Pat. Nos. 3,846,163 and 3,879,248.

U.S. Pat. No. 3,681,277 discloses a process for preparing solvent free pressure-sensitive adhesive from mixtures of polyisocyanate and polyoxyalkylated diol or polyol and a tackifier. This specification discloses that the polyol may be a poly(alkylene oxide) which is unbranched, branch-chained or partly branched. Examples given of suitable compounds are those obtained by the polyoxyalkylation of dihydric or polyhydric, preferably dihydric and/or trihydric, alcohols, such as ethylene glycol, propylene glycol, trimethylol propane and glycerol, with ethylene oxide and/or preferably propylene oxide. Suitable poly(alkylene oxides) have molecular weights of from 300 to 10,000 for example from 900 to 5,000 and preferably from 1,500 to 4,000 and more preferably from 2,100 to 3,000 and hydroxyl numbers ranging from 30 to 85, preferably from 45 to 75 and more preferably from 50 to 65. The specification is directed primarily at producing OH bearing end products, and requires mixing of the components immediately prior to use i.e. the mixture is not storage stable.

It would be economically beneficial to users of pressure-sensitive adhesives to have available a pressure-sensitive adhesive capable of simple application to provide a high quality pressure sensitive adhesive without the need to mix materials immediately prior to application, or the necessity to provide heating or drying equipment. It would also be beneficial to provide a pressure-sensitive adhesive based on commonly available, inexpensive, raw materials which can be readily applied at room or slightly elevated temperature to required substrates and then capable of becoming cured under relatively mild conditions and so achieve a desirable combination of pressure-sensitive and other properties.

It is one of the objects of the present invention to provide an improved pressure-sensitive adhesive.

SUMMARY OF THE INVENTION

We have now found that one-component moisture-curing polyurethane-based pressure-sensitive adhesives which are comparable in their properties to high-performance acrylate-or rubber-based pressure-sensitive adhesives and which have high holding power and heat resistance as well as high tack and peel strength, but which are applicable without solvents and without the need for mixing of components by the user, may be produced from inexpensive raw materials by use of selected mixtures including specific prepolymers to provide a prepolymer component of specific isocyanate functionality.

The invention provides in one of its aspects a moisture-curable adhesive composition capable of providing a pressure-sensitive adhesive layer on a substrate by a process in which the composition is applied to the substrate and cured or allowed to cure by exposure to a moist atmosphere, the composition comprising a prepolymer component having an isocyanate functionality between 2.0 and 3.0 together with one or more polyetherurethane prepolymers having NCO groups available for reaction with water for chain extension, the cured adhesive composition having a glass transition temperature less than 20° C.

Desired properties of an adhesive composition according to the present invention are achieved by appropriate selection of the ingredients of the prepolymer component, and additional resins and plasticizers when used. By appropriate selection of the various components and, in particular, the prepolymer, of the adhesive composition and its functionality, it may be possible to produce a range of adhesive compositions each of which is especially adapted for a specific purpose.

Adhesive compositions according to the invention are one-component systems and allow the consumer many opportunities arising from freedom of application on different shaped substrates as well as fabrication of tapes and sheets, and arising from the variety of curing conditions which may be used, the simplest of which is exposure to atmospheric moisture at room temperature.

Tackiness of a layer of an adhesive composition according to the invention and the strength of adhesive bonds formed by use thereof is related to the adhesive properties of the polyetherurethanes used. The degree of tack and adhesion may be beneficially influenced by inclusion of a tackifying resin and optionally a plasticiser. Pressure sensitivity of an adhesive composition according to the invention and holding power and heat resistance of the final bond are strongly influenced by the extent to which the adhesive layer is tacky and cohesive at the time the bond is formed, and by the extent to which the bonding layer is cross linked. We have found that it is vitally important to ensure the prepolymer component has an NCO functionality of between 2.0 and 3.0. The presence of NCO groups available for reaction with water (e.g. atmospheric moisture) is important to ensure that deposited layers of the adhesive cure by exposure to a moist atmosphere to a desired tacky, cohesive condition in which bonds of high strength having good heat resistance may be formed by pressing a substrate against the layer. Curing via the NCO-moisture reaction leads to a chain extension and cross linking via urea groups, leading to improved cohesion of the cured layer and improved heat resistance of the layer. However, higher amounts of cross linking of the layer yield products of reduced tackiness. Thus, an NCO functionality of not less than 2.0 is desirable in order to ensure some linear chain extension of the deposited adhesive, but an NCO functionality in excess of 3 yields tough products unsuitable as a basis for pressure-sensitive adhesives. An NCO functionality of the prepolymer component in the range 2.0 to 2.6 is highly desirable in order to produce products with suitably controlled amounts of cross linking, and so yield the best combination of properties for a pressure-sensitive adhesive, as judged by conventional procedures for tack, peel strength, and shear adhesion, but prepolymer components with functionality as high as 3 may give satisfactory products for some purposes.

Isocyanate functionalities quoted herein are measured by reaction of 1.6 hexanediol applying the gel point method and have an accuracy of ±0.2.

Tackiness of a composition according to the invention is derived principally from the use of polyether based prepolymers of the prepolymer component. In order to achieve suitable tackiness of the deposited layer, the glass transition temperature (as measured by DSC method) of the cured adhesive composition is not greater than about room temperature i.e. less than 20° C. Most preferred results are achieved with prepolymers which result in cured compositions having glass transition temperatures of less than 0° C. The use of polyetherurethane prepolymers also permits production of adhesive compositions which are liquid products, ranging from thick liquids of moderate viscosity to sticky viscous liquids which may be simply applied at room temperature or slightly elevated temperatures in a condition in which they "wet-out" onto many substrates to provide a good basis for adhesive bonding.

Moisture curable adhesives according to the invention having good pressure-sensitive characteristics may employ a prepolymer component produced in any suitable way, provided that the prepolymer component has a functionality between 2.0 and 3.0. The desired functionality may be achieved by use of polyetherurethane prepolymers of various functionalities. If desired prepolymers of lower functionalities may be used in conjunction with low molecular weight polyisocyanates of functionality in excess of 2.0 in order to achieve a suitable NCO functionality of the prepolymer component. The polyetherurethane prepolymers are derived from diisocyanates and polyethers which is to say polyoxyalkylene ether polyols including materials commonly referred to as polyoxyethylene glycols and triols and polyoxypropylene glycols and triols. Polyetherurethane prepolymers suitable for use in the prepolymer component of any adhesive compositions according to the present invention include prepolymers derived from polyethers which are linear materials or branched materials. Suitable polyethers are addition products of ethylene oxide or of propylene oxide or of mixtures thereof reacted with difunctional materials, for example ethylene glycol, propylene glycol or water to provide linear polyether polyol materials or reacted with tri—or higher—functional materials for example glycerol, pentaerythritol or trimethylol propane to provide branched polyether polyol materials. The linear materials are regarded as difunctional i.e. as having two reactive hydroxyl groups per molecule, whereas the branched materials are regarded as having a functionality in excess of two. Whilst a functionality of three may be postulated for many such materials, some commercially available materials have a functionality indicating that the material comprises a mixture of polyethers of different functionalities. For example compositions according to the invention may be produced using branched chain polyethers having an average hydroxyl functionality in excess of 2.0, for example in the range 2.4 to 2.8 or greater.

Linear polyether polyols suitable for preparation of the polyetherurethane prepolymers (hereinafter referred to as the first prepolymer), include those linear polyethers having a hydroxyl number (mg KOH per g) from 10 to 230. Materials having OH values of greater than 230 yield products with insufficient tackiness and those having OH values below 14 are not readily available. For a preferred blend of properties we prefer to employ linear polyethers having a hydroxyl number from 28 to 112 and more preferably about 28 to 56. A hydroxyl number of 56 for a polypropylene glycol ether corresponds to a molecular weight of about 2000.

Branched polyether polyols suitable for preparation of polyetherurethane prepolymers (hereinafter referred to as the second prepolymer), include those of a functionality of up to 3.0 preferably about 2.4 to about 2.8, and which have a hydroxyl number from 10 to 570. For a preferred blend of properties, we prefer to employ branched polyethers of functionality of about 2.5 having a hydroxyl number from 25 to 56 and more preferably about 25 to 36. Preferred branched polypropylene glycol ethers of hydroxyl number of 36 have molecular weights about 4,700.

The polyetherurethane prepolymers preferably are prepared by use of any of the commonly available diisocyanates or mixtures thereof, for example the aromatic diisocyanates e.g. diphenyl methane diisocyanates, toluene diisocyanates, the aliphatic diisocyanates e.g. hexane diisocyanates, and the cycloaliphatic diisocyanates e.g. isophorone diisocyanate and cyclohexyl methane diisocyanate. Preferred materials are the diphenyl methane diisocyanates and especially the 4.4' isomer and mixtures of the 2.4 and 4.4' isomers.

Pressure-sensitive adhesives may be produced using a first prepolymer made at an NCO:OH ratio in the range 1.2 to 2.5. However a preferred range for optimum properties is from 1.35 to 2.0, a most preferred range being from about 1.6 to about 2.0. Pressure sensitive adhesives may be produced using a second prepolymer made at an NCO:OH ratio in the range 1.2 to 2.5. However a preferred range is 1.8 to 2.2, a most preferred value being 2.0.

Catalysts are preferably employed in the preparation of the polyetherurethane prepolymers, and are preferably allowed to remain in the adhesive composition where they are of assistance in controlling chain extension of the prepolymers during moisture cure. Suitable catalysts include dibutyl tin dilaurate.

Among especially preferred prepolymer components are those comprising a mixture of (A) first and second polyetherurethane prepolymers having NCO groups available for reaction as aforesaid i.e. a first prepolymer being a reaction product of a linear polyol of hydroxyl number from 10 to 230 which is an addition product of one or both of ethylene oxide and propylene oxide, and a diisocyanate reacted in amounts to provide an NCO:OH ratio from 1.2 to 2.5, and a second prepolymer being a reaction product of a branched polyol of hydroxyl number from 10 to 570 which is an addition product of one or both of ethylene oxide and propylene oxide, and a diisocyanate reacted in amounts to provide an NCO:OH ratio from 1.2 to 2.5, so as to provide a prepolymer component having an NCO functionality between 2.0 and 3.0 or (B) a reaction product of a second polyetherurethane prepolymer as aforesaid i.e. a reaction product of a branched polyol of hydroxyl number from 10 to 570 which is an addition product of one or both of ethylene oxide and propylene oxide and a diisocyanate reacted in amounts to provide an NCO:OH ratio from 1.2 to 2.5, further reacted with a monofunctional alcohol so as to provide a prepolymer component having an NCO functionality between 2.0 and 3.0, or (C) a polyisocyanate of low molecular weight having a functionality of greater than 2 and a first polyetherurethane prepolymer as aforesaid i.e. a reaction product of a linear polyol of hydroxyl number from 10 to 230 which is an addition product of one or both of ethylene oxide and propylene oxide, and a diisocyanate reacted in amounts to provide an NCO:OH ratio from 1.2 to 2.5, the polyisocyanate and prepolymer being mixed in a ratio such that the functionality of the prepolymer component lies between 2.0 and 3.0.

In relation to the prepolymer components of type (A) referred to above the NCO functionality is provided by the mixture of the two prepolymers, one nominally difunctional and one nominally trifunctional or thereabout. In principal the first and second prepolymers are predominantly isocyanate-capped polyether polyols. The first prepolymer is essentially a difunctional prepolymer and is regarded as a primary vehicle for linear extension of difunctional molecular chains as curing proceeds, and its chain length (as reflected in the OH value of the diol) and capacity for chain extension e.g. by moisture as reflected in its NCO:OH ratio are chosen so as to provide a suitable basis for the adhesive. The second nominally trifunctional prepolymer is regarded as providing for chain branching or cross-linking of the molecular chains through its branched structure of higher functionality as chain extension proceeds. The chain size of the second prepolymer (as reflected in the OH value of the branched polyether) and the NCO:OH ratio are chosen so as to influence the chain extension to provide a permanently tacky, cohesive bonding layer. The two polyetherurethane prepolymers are employed in relative quantities to provide the desired blend of prolonged tackiness and cohesion after curing to provide strong adhesive bonds having heat resistant properties. Relatively greater amounts of the second prepolymer lead to increased capacity for cross linking whereas relatively smaller amounts of the second prepolymer lead to more tacky and less cohesive layers which result in bonds of lower heat resistance. Preferred compositions employ mixtures of the preferred first and second prepolymers in amounts such that the ratio of NCO equivalents of the first prepolymer to NCO equivalents of the second prepolymer is in the range 1:2 to 10:1, more preferably in the range 1.5:1 to 5:1.

In relation to the prepolymer component of type (B) referred to above, the polyetherurethane prepolymer is a reaction product of a branched polyol from one or both of ethylene oxide and propylene oxide and a polyisocyanate is employed. The prepolymer preferably is formed from a polyether having a hydroxyl number in the range 25 to 56, more preferably 25 to 36. Preferably the prepolymer reactants are employed in amounts providing an NCO:OH ratio in the range 1.8 to 2.2. A most preferred NCO:OH ratio is about 2.0. The amount of monofunctional alcohol employed is chosen so that a desired functionality of the prepolymer component between 2.0 and 3.0 is achieved. Chain extension and chain branching of the polymer as it cures due to exposure to moisture occur to a desired degree dependent on the functionality of the second prepolymer used.

Monofunctional alcohols which may be further reacted with the polyetherurethane prepolymer include monofunctional alcohols having branched or unbranched saturated aliphatic chains, and especially branched chain alcohols having from 2 to 10 carbon atoms in their molecule for example 2-ethyl hexanol. Suitable monofunctional alcohols also include resins having monofunctional alcohol groups for example the material supplied under the trade name "Abitol" which is understood to be a primary monofunctional alcohol material of rather high molecular weight (approximately 290) from resin acids comprising about 83% hydroabietyl alcohol and having a hydroxyl content of about 4.85%, an acid number of about 0.3 and an unsaturation (in g hydrogen absorbed per 100 g "Abitol") of about 0.71.

In relation to the prepolymer component of type (C) referred to above, a first polyetherurethane prepolymer which is a reaction product of a linear polyol from one or both of ethylene oxide and propylene oxide and a polyisocyanate is employed. The prepolymer is preferably formed from a polyether having a hydroxyl number in the range 28 to 112, more preferably 28 to 56. Preferably the prepolymer reactants are employed in amounts providing an NCO:OH ratio in the range 1.2 to 2.5 more preferably in the range 1.35 to 2.0. A most preferred NCO:OH ratio is in the range of about 1.6 to about 2.0. The additional polyisocyanate used has a functionality in excess of two and is used to ensure the functionality of the prepolymer component is from 2.0 to 3.0. Suitable polyisocyanates include those of number average molecular weight less than 600, for example polymethylene polyphenyl isocyanate which is understood to have a number average molecular weight of 400 and an NCO functionality of about 2.8. In this case linear chain extension results from cure of the prepolymer and the necessary degree of cross linking results from reactions with the polyfunctional isocyanate.

An adhesive composition according to the invention may include one or more tackifying resins. Many compositions according to the invention have a comparatively non-aggressive tack, and it is therefore highly preferred to employ a tackifying resin. Resins compatible with the prepolymers and the cured adhesives are preferred and especially those with a low acid number, preferably less than 5 more preferably less than 1, and low reactivity towards isocyanate. Examples of suitable resins include esters of rosins and hydrocarbon resins, especially indene type resins. The resins are used preferably in amounts to provide 1 to 40% by weight of the composition, more preferably 5 to 30% by weight of the composition.

An adhesive composition according to the invention may also include one or more plasticisers. Preferred plasticisers also have a low acid number, and include for example phthalates, alkylsulphonates and fatty acid esters. The plasticisers are preferably used to provide up to 10% by weight of the composition.

An adhesive composition acccording to the invention may also include other adjuvants, for example stabilisers for improving the stability of the composition e.g. to the effects of ultraviolet light, or oxidation, or for radical scavenging.

An adhesive composition according to the invention is susceptible to curing by atmospheric moisture, but has a substantially infinite potlife if stored prior to application in a moisture free atmosphere for example in a sealed moisture proof container filled with the composition. An adhesive composition according to the invention is preferably a liquid, solvent free, material, and may be a flowable liquid of moderate to high viscosity or a sticky viscous liquid of comparatively poor flow and wetting properties which is convertible to a readily flowable liquid at temperatures of 100° C. or less, so that the composition may be readily extruded solvent-free at a viscosity in the range 10 to 100 Pas at room or slightly elevated temperature onto a workpiece, to wet-out on the workpiece and penetrate somewhat into porous surfaces, and provide a good basis for adhesion to the workpiece. Thus, adhesive compositions according to the invention may be simply applied, as by brush or extrusion nozzle to provide a deposited layer on a workpiece which automatically converts to a cohesive solid tacky layer strongly adherent to the workpiece upon exposure to a moist atmosphere. The build up of strength of the adhesive layer may be accelerated by mild moistening and heating conditions if desired.

After application of an adhesive composition according to the invention to provide a layer on a substrate of adequate thickness, suitably of the order of from 0.05 mm to 0.3 mm, more preferably about 0.08 mm thick, the composition exhibits a tackiness such that it may be used as a pressure-sensitive adhesive layer. It is preferred to allow or cause the layer to develop improved cohesive properties through its somewhat cross linked condition by exposure to a moist atmosphere at room or moderately elevated temperature prior to use as a pressure-sensitive adhesive. We have found that preferred compositions may require from 1 to 7 days to develop optimum cohesive and pressure-sensitive properties by exposure to atmospheric moisture at room temperature, whereas the same compositions require from 3 to 20 minutes to develop optimum pressure-sensitive properties when heated to 90° C. in an air-circulating-oven in a water containing atmosphere. Preferably, the composition is cured in an atmosphere having a relative humidity above 10% at a temperature in the range 20° C. to 120° C., for example relative humidity in the range 10 to 25% may be suitable at a temperature of about 90° C. Longer cure times are required at lower temperatures but the cure time may be reduced substantially by use of the higher temperatures if desired. Tackiness of layers of the preferred compositions remains at a high level for periods in excess of three months after curing, and good quality bonds may be made during this period by simple application of light pressure to a substrate placed against the layer without application of other inducements for example heat. Adhesive compositions according to the invention used in this way have been found to provide adhesives having good pressure-sensitive characteristics which provide bonds demonstrating exceptional heat resistance (i.e. holding power at 100° C.) and peel strength.

The invention provides in another of its aspects a method of forming a pressure-sensitive adhesive layer on a workpiece comprising applying to the workpiece a solvent free mass of composition at a viscosity in the range 10 to 100 PaS to provide a layer from 0.05 to 3 mm thick, and exposing the layer to a moist atmosphere having a relative humidity above 10% suitably at a temperature in the range 20° C. to 120° C. to effect cross linking of the composition. Conveniently in carrying out a method in accordance with the invention the relative humidity is in the range 10% to 75%.

EXAMPLES

In order that the invention may become more clear, there now follows a description of nineteen example adhesive compositions and their method of use all of which are according to the invention and illustrative thereof. It is to be understood that these Examples have been selected for description only to illustrate the invention and are not intended to define any limitation of the scope thereof.

The exemplified adhesive compositions are moisture curable adhesives capable of providing a pressure-sensitive layer on a substrate by a process in which the composition is applied to the substrate and cured or allowed to cure by exposure to a moist atmosphere. Each composition includes a prepolymer component having NCO groups available for reaction with water for chain extension.

The examples of first and second prepolymers employed in preparation of the exemplified compositions were prepared using the ratios and the amounts by weight of the materials shown in Table 1, according to the following procedures.

The first prepolymers i.e. Prepolymer Nos. 1, 4 and 6 were made by mixing and heating for 1½ hours at 80° C. a linear, polyether polyol together with 1.3 parts by weight tosylisocyanate. The diisocyanate was added to the heated polyol and after a period of one hour, with temperature set at 100° C., about 6 g of a 10% solution of dibutyl tin dilaurate in "Mesamoll" (an alkyl sulphonic acid ester plasticiser) were added.

The second prepolymers, Prepolymer Nos. 2, 3 and 5, were made by mixing a branched, polyether polyol at 80° C. with 2.3 g (or in the case of Prepolymer No. 5; 1.8 g) of tosyl isocyanate and the diisocyanate. After one hour 10.5 g (or in the case of Prepolymer No. 5; 8.3 g) of a 10% solution of dibutyl tin dilaurate in "Mesamoll" were added, and heating at 100° C. continued for ½ hour. The prepolymers were stored in containers which were sealed until required for use. The second prepolymer No. 7 was made by mixing the molten disocyanate with the branched polyether and 1,3 g tosyl isocyanate for 45 minutes at 80° C. 6,0 g of a 10% solution of dibutyl tin dilaurate in mesamoll was added and heating continued for 15 minutes at 100° C.

Material mentioned in Table 1 are identified as follows:

"Voranol" P2000 is a linear polyether diol mainly formed from propyleneglycol and having a molecular weight of about 2000 and an OH number of 56.

"Voranol" CP4655 is a branched polyether mainly formed from propylene glycol and ethylene glycol and having a molecular weight of about 4,700 and an OH number of 35.

"Polyurax" U 24-04 is a branched polyether mainly formed from propylene glycol having an OH number of 41.

"Napiol" DS 25 is a linear polyether having an OH number of 28 mainly formed from propyleneglycol and ethyleneglycol.

"Desmophen" 1910 U is a branched polyether mainly formed from propyleneglycol, having an OH number of 43.

Adhesive compositions 1 to 13 (Table 2) are examples of compositions according to the invention which employ a prepolymer component of type (A) as referred to above, i.e. a mixture of first and second prepolymers which together provide an NCO functionality between 2.0 and 3.0, for example the NCO functionality of the mixed prepolymer components in adhesive compositions 5 and 13 is about 2.1.

Adhesive compositions 14 to 17 (Table 3) are examples of compositions according to the invention which employ a prepolymer component of type (B) as referred to above, i.e. a second prepolymer further reacted with a monofunctional alcohol and having an NCO functionality between 2.0 and 3.0, for example the NCO functionality of the prepolymer component in adhesive composition 14 is about 2.1 and in adhesive composition 17 about 2.9.

Adhesive compositions 18 to 20 (Table 4) are examples of compositions according to the invention which employ a prepolymer component of type (C) as referred to above, i.e. a first prepolymer and a polyisocyanate of functionality greater than 2 to provide a prepolymer component having an NCO functionality between 2.0 and 3.0, for example NCO functionality of adhesive composition 18 is about 2.0.

The exemplified adhesive compositions were prepared from materials in the amounts shown in Tables 2, 3 and 4 (the percentages indicated in the Tables are approximate). All of the cured exemplified adhesive compositions have a glass transition temperature less than 0° C., most being about $-45°$ C.

In order to prepare the first exemplified adhesive composition, Prepolymer No. 2 was heated to 100° C. and mixed with Prepolymer No. 1. 30 minutes after addition of the catalyst used in preparing Prepolymer No. 1. Ten minutes after addition of Prepolymer No. 2, the resin and 2.11g of a 10% solution of dibutyl tin dilaurate in "Mesamoll" were added. After 15 minutes of mixing, the product was evacuated and filled into cartridges which were sealed.

Exemplified compositions 2 to 13 were prepared in a similar fashion (see Table 2).

Exemplified adhesive compositions 14, 15 and 16 (see Table 3) were made by use of Prepolymer No. 5. The monofunctional alcohol was added to the prepolymer at a temperature of 100° C. Ten minutes after this addition the resin was mixed in, together with 2 g of a 10% solution of dibutyl tin dilaurate in "Mesamoll". After 15 minutes mixing, the product was degassed by evacuation of the vessel and filled into cartridges which were sealed.

Exemplified adhesive composition 17 (Table 3) was made by use of Prepolymer No. 7. To the prepolymer the resin, the plasticizer and 4.0g of a 10% solution of dibutyl tin dilaurate in mesamoll were added at 100° C. and stirred for 45 minutes at 100° C. The product was filled into cartridges which were sealed.

Exemplified adhesive compositions 18 to 20 (see Table 4) were made by use of one of Prepolymer Nos. 4 and 6. The polyfunctional isocyanate was added to the prepolymer at a temperature of 100° C. and ten minutes later, the resin, plasticiser and 2 g of a 10% solution of dibutyl tin dilaurate in "Mesamoll" were added. After 15 minutes mixing the product was degassed by evacuation of the vessel and filled into cartridges which were sealed.

Materials mentioned in Tables 2, 3 and 4 are identified as follows:

Resin KW31 is an indene type resin having an acid number less than 0.1.

Modified "Staybelite" Ester 10 is glycerol ester of partially hydrogenated wood rosin (acid number :8). COOH groups have been reacted with 4.4'- diphenyl methane diisocyanate in a previous separate reaction (NCO/COOH ratio 1/1).

"Piccotex" LC is a copolymer of methyl styrene and vinyl toluene having an acid number less than 1.0.

"Santicizer" 160 is benzyl butyl phthalate having an acid number of 0.2.

MXP 2020 is a mixture of hydrogenated polyphenyls having an acid number of 0.01.

"Lipinol" T is dibenzyl toluene.

"Mesamoll" is an alkyl sulphonic acid ester of acid number less than 0.1.

"Wingtack" 10 is a liquid synthetic polyterpene resin of acid number 0.18.

A 187 is gamma glycidoxypropyltrimethoxysilane.

"Irganox" 1035 is 2,2' Thiodiethylbis-[3-(3,5-di-tert.-butyl-4-hydroxyphenyl)propionate] present primarily as an oxidation stabilizer and radical scavenger.

"Tinuvin" 328 is 2-(2 Hydroxy-3,5-di-tert.-amylphenyl)-2 H-benztriazole present primarily as an ultraviolet stabilizer and absorber.

In order to examine properties of the exemplified adhesive compositions, layers of each composition 0.08 mm thick were formed by spreading the composition on a foil of polyethyleneterephthalate (MYLAR ®) 0.08 mm thick. The layers of Examples 1 to 9 were cured to a definite complete state by ageing the samples for 16 hours at room temperature and humidity (about 21°±2° and 30 to 70% relative humidity), followed by 30 minutes ageing in an air circulation oven at 90° C. saturated with moisture. Examples 10 to 12 and 14 to 20 were cured to definite complete state by 5 minutes at 85° C. in an air circulation oven in the presence of moisture. After cooling, the samples were subjected to various standard tests, and compared with results of the same tests conducted with samples prepared from commercially available adhesives referred to as comparative adhesives 1 & 2 respectively. Comparative adhesive Sample 1 (3M 9460) is a high performance acrylate based pressure-sensitive adhesive. Comparative adhesive Sample 2 (Bostik 9988) is a high performance thermoplastic rubber based pressure-sensitive adhesive.

Results are shown in Table 5.

Rolling Ball tack was measured by a method according to PSTC-6 in which a stainless steel ball (5.4 g, 7/16 inch (about 1.1 cm, diameter) and a standard Rolling Ball Test Apparatus is used. The stopping distances are measured in millimeters.

Peel Test was conducted by a method according to PSTC-1 in which the pressure-sensitive substrates were laid on stainless steel panels and secured by passing a 4.5 lb (about 2 kg.) roller over the sample once in each lengthwise direction. The test specimens were one inch wide and ten inches in length. 180° peel adhesion was tested using an "Instron" tensiometer within 30 minutes of preparation of the test specimens at a separation speed of 12 inches (about 30.5 cm.) per minute.

Holding Power was conducted by a method according to PSTC-7 in which the pressure-sensitive substrates were fixed on an area of 1.0 to 0.5 inches (about 2.54 to 1.27 cm) on a stainless steel panel in the same way as used for the peel test specimens. Within 30 minutes of preparation, the specimens were placed so that the extending tape hung downwards. A 1 Kg load was suspended from the tape. Test specimens were observed at room temperature up to 48 hours and at 70° C. and 100° C. up to 24 hours with respect to separation and the time noted if total separation occurred earlier.

The testing of example composition 13 was carried out using samples made as described above but with the curing step carried out by ageing for 14 days at 21° C.±2° C., RH 30 to 70%.

With regard to pressure-sensitive adhesives, materials giving results in the rolling ball tack test of less than 300 mm are regarded as having suitably aggressive tack for many purposes where lighter pressures are likely to be applied, or a more permanent bond is required. Peel test result values in excess of 5 N/25 mm are regarded as desirable for good quality adhesion. Holding power results above 70° C. in excess of 24 hours are desirable for many purposes. Holding power results at elevated temperatures in excess of 24 hours are regarded as unusual, and indicate high heat resistance of the bonds, which is a highly desirable feature.

As can be seen from the tables compositions including about 19 weight % KW 31 resin result in best overall properties. Higher concentrations of resin (example 12) raise the peel strength but diminish the heat resistance.

Plasticizer "Santicizer" 160 added to compositions has the best influence on tack and peel strength (example 5-9). In general plasticizer addition of about 2 to 5% is preferred to give good tack. No significant improvement appears to result from the addition of the silane adhesion promoter tested.

It will be appreciated that Examples 5 and 13 utilise the same basic adhesive composition; however, as noted above, different curing techniques are employed. From Table 5 it can be seen that the properties of the composition of Examples 5 and 13 are affected by the curing technique used, though the reasons for this are not yet clear.

The addition of "Abitol" instead of 2-Ethyl hexanol (table 3) appears to yield adhesives of generally better properties. In general, mixtures of prepolymer No. 4. (Table 4) with polymethylene polyphenyl isocyanate result in products with less tack and peel strength but better holding power compared to those mixtures with prepolymer No. 6.

TABLE 1

Formulation of prepolymers

| Material (parts by weight) | Prepolymer No 1(I) | 2(II) | 3(2) | 4(8) |
|---|---|---|---|---|
| polyol | | | | |
| "VORANOL" P2000 | 500 | — | — | 500 |
| "VORANOL" CP4655 | — | 900 | 900 | — |
| "POLYURAX" U 24-04 | — | — | — | — |
| "NAPIOL" DS 25 | — | — | — | — |
| polyisocyanate | | | | |
| 4,4' diphenyl methane diisocyanate | 102 | — | 143 | 120 |
| Mixture of 60% 2,4' diphenyl methane diisocyanate and 40% 4,4' diphenyl methane | — | 143 | — | — |

TABLE 1-continued

Formulation of prepolymers

| | | |
|---|---|---|
| "VORANOL" CP4655 | — | — |
| "POLYURAX" U 24-94 | 700 | — |
| "NAPIOL" DS 25 | — | 500 |
| "DESMOPHEN" 1910 U | — | — |
| polyisocyanate | | |
| 4,4' diphenyl methane diisocyanate | 123 | 64 |
| Mixture of 60% 2,4' diphenyl methane diisocyanate and 40% 4,4' diphenyl methane diisocyanate | — | — |
| 4,4' diphenyl methane diisocyanate | — | 102 |
| NCO:OH ratio | 2.0 | 2.0 |

(second column for "DESMOPHEN" 1910 U: 500; 4,4' diphenyl methane diisocyanate mixture row value: 102)

TABLE 2

Formulation of compositions of Examples 1 to 13

| Adhesive composition | 1(1) | 2(2) | 3(3) | 4(5) | 5(4a) | 6(4b) | 7(4c) |
|---|---|---|---|---|---|---|---|
| Material (parts by weight) | | | | | | | |
| First Prepolymer | | | | | | | |
| Prepolymer No 1 | 605 | 605 | 603 | 605 | 598 | 605 | 604 |
| Prepolymer No 4 | — | — | — | — | — | — | — |
| Second Prepolymer | | | | | | | |
| Prepolymer No 2 | 257 | — | 263 | 258 | 259 | 262 | 257 |
| Prepolymer No 3 | — | 257 | — | — | — | — | — |
| Resin KW31 | 206(19%) | 205(19%) | — | — | 205(19%) | 205(19%) | 205(19%) |
| Modified "STAYBELITE" Ester 10 | — | — | 206(19%) | — | — | — | — |
| "PICCOTEX" LC | — | — | — | 205(19%) | — | — | — |
| Plasticiser | | | | | | | |
| "MESAMOLL" | 9.8 | 9.8 | 9.8 | 9.8 | 9.8 | 9.8 | 9.8 |
| "SANTICISER" 160 | — | — | — | — | 21.5(2%) | — | — |
| MXP 2020 | — | — | — | — | — | 21.8(2%) | — |
| "LIPINOL" | — | — | — | — | — | — | 32.3(3%) |
| "MESAMOLL" | — | — | — | — | — | — | — |
| "WINGTACK" 10 | — | — | — | — | — | — | — |
| A187 | — | — | — | — | — | 5.4(0.5%) | — |
| Stabilizer | | | | | | | |
| "IRGONOX" 1035 | | | | | | | |
| "TINUVIN" 328 | | | | | | | |
| Ratio NCO equivalents of first prepolymer to second prepolymer. | 2.1 ± 0.1 | 2.1 ± 0.1 | 2.1 ± 0.1 | 2.1 ± 0.1 | 2.1 ± 0.1 | 2.1 ± 0.1 | 2.1 ± 0.1 |

| Adhesive composition | 8(4d) | 9(4e) | 10(7) | 11(8) | 12(9) | 13(6) |
|---|---|---|---|---|---|---|
| Material (parts by weight) | | | | | | |
| First Prepolymer | | | | | | |
| Prepolymer No 1 | 604 | 605 | 596 | — | 596 | 598 |
| Prepolymer No 4 | — | — | — | 621 | — | — |
| Second Prepolymer | | | | | | |
| Prepolymer No 2 | 257 | 257 | — | — | — | 259 |
| Prepolymer No 3 | — | — | 169 | 208 | 228 | — |
| Resin KW31 | 205(19%) | 205(19%) | 183(19%) | 197(19%) | 250(22%) | 205(19%) |
| Modified "STAYBELITE" Ester 10 | — | — | — | — | — | — |
| "PICCOTEX" LC | — | — | — | — | — | — |
| Plasticiser | | | | | | |
| "MESAMOLL" | 9.8 | 9.9 | 8.8 | 9.4 | 10.0 | 9.8 |
| "SANTICISER" 160 | — | — | 19.1(2%) | 20.6(2%) | 26.2(2.3%) | 21.5(2%) |
| MXP 2020 | — | — | — | — | — | — |
| "LIPINOL" | — | — | — | — | — | — |
| "MESAMOLL" | 32.3(3%) | — | — | — | — | — |
| "WINGTACK" 10 | — | 21.6(2%) | — | — | — | — |
| A187 | — | — | — | — | — | — |
| Stabilizer | | | | | | |
| "IRGONOX" 1035 | — | — | 0.25% | 0.25% | 0.25% | — |
| "TINUVIN" 328 | — | — | 0.25% | 0.25% | 0.25% | — |
| Ratio NCO equivalents of first prepolymer to second prepolymer. | 2.1 ± 0.1 | 2.1 ± 0.1 | 3.1 ± 0.1 | 4.2 ± 0.1 | 2.3 ± 0.1 | 2.1 ± 0.1 |

| | Prepolymer No 5(10) | 6(14) | 7 |
|---|---|---|---|
| Material (parts by weight) | | | |
| polyol | | | |
| "VORANOL" P2000 | — | — | |
| diisocyanate NCO:OH ratio | 1.6 | 2.0 | 2.0 2.0 |

TABLE 3

Formulation of compositions of Examples 14 to 16

| Adhesive composition | 14(10) | 15(11) | 16(12) | 17 |
|---|---|---|---|---|
| Material (parts by weight) | | | | |
| Second prepolymer | | | | |

TABLE 3-continued

Formulation of compositions of Examples 14 to 16

| Adhesive composition | 14(10) | 15(11) | 16(12) | 17 |
|---|---|---|---|---|
| Prepolymer No 5 | 825 | 659 | 659 | — |
| Prepolymer No 7 | — | — | — | 609 |
| Monofunctional alcohol | | | | |
| "ABITOL" | 46.4 | 41.7 | — | — |
| 2-ethyl hexanol | — | — | 16.7 | — |
| Resin KW 31 | 155(15%) | 124(15%) | 124(15%) | 303(30%) |
| Plasticiser | | | | |
| "MESAMOLL" | 10.3 | 8.2 | 8.2 | 10 |
| "SANTICIZER" | — | — | — | 101(10%) |
| Stabilizer | | | | |
| "IRGANOX" 1035 | 0.25% | 0.25% | 0.25% | — |
| "TINUVIN" 328 | 0.25% | 0.25% | 0.25% | — |

TABLE 4

Formulation of compositions of Examples 17 to 19

| Adhesive composition | 18(13) | 19(14) | 20(15) |
|---|---|---|---|
| Material (parts by weight) | | | |
| First prepolymer | | | |
| Prepolymer No 4 | 623 | — | — |
| Prepolymer No 6 | — | 566 | 564 |
| Polyisocyanate polymethylene polyphenyl isocyanate (PAPI 580S) | 14.9 | 9.8 | 17.8 |
| Functionality of polyisocyanate | 2.8 | 2.8 | 2.8 |
| Resin | | | |
| KW 31 | 154(18%) | 181(22%) | 111(15%) |
| Coumarone indene resin | — | 21(2.5%) | — |
| Plasticiser | | | |
| "MESAMOLL" | 8.4 | 8.3 | 8.0 |
| "SANTICIZER" 160 | 64(7%) | 42(5%) | 37(5%) |
| Stabilizer | | | |
| "IRGANOX" 1035 | 0.25% | 0.25% | 0.25% |
| "TINUVIN" 328 | 0.25% | 0.25% | 0.25% |

TABLE 5

| Test | Rolling Ball Tack (mm) | Peel Test (N/ 25 mm) | Holding Power (hours) | | |
|---|---|---|---|---|---|
| | | | Room temperature | 70° C. | 100° C. |
| Examples | | | | | |
| 1 (1) | 220 | 12 | >48 | >24 | |
| 2 (2) | 130 | 7 | >48 | >24 | |
| 3 (3) | 50 | 14 | >48 | | |
| 4 (5) | 70 | 3 | >48 | | |
| 5 (4a) | 50 | 17 | >48 | >24 | |
| 6 (4b) | 60 | 13 | >48 | >24 | |
| 7 (4c) | 60 | 9 | >48 | >24 | |
| 8 (4d) | 50 | 11 | >48 | >24 | |
| 9 (4e) | >300 | 10 | >48 | >24 | |
| 10 (7) | 60 | 21 | >48 | | >24 |
| 11 (8) | 160 | 7 | >48 | | >24 |
| 12 (9) | 70 | 27 | >48 | | 1 |
| 13 (6) | 60 | 9 | >48 | | >24 |
| 14 (10) | 50 | 11 | >48 | | >24 |
| 15 (11) | 60 | 17 | >48 | | >24 |
| 16 (12) | 50 | 8 | — | | |
| 17 | 90 | 3 | >48 | | 0 |
| 18 (13) | 300 | 6 | >48 | | >24 |
| 19 (14) | 70 | 25 | 1.5 to 6 | | 0 to 0.5 |
| 20 (15) | 80 | 8 | 40 | | — |
| Comparative Samples | | | | | |
| 1 | — | 18 | >48 | | 0.5 to 18 |
| 2 | >150 | 30 | >48 | | 0 |

We claim:

1. A moisture-curable adhesive composition capable of providing a pressure-sensitive adhesive layer on a substrate by a process in which the composition is applied to the substrate and cured or allowed to cure by exposure to a moist atmosphere, wherein the composition comprises a prepolymer component having an isocyanate functionality between 2.0 and 3.0 together with one or more polyetherurethane prepolymers having NCO groups available for reaction with water for chain extension, the cured adhesive composition having a glass transition temperature less than 20° C.

2. An adhesive composition according to claim 1, wherein the prepolymer component comprises a mixture of prepolymers having NCO groups available for reaction, a first one of said prepolymers being a reaction product of a linear polyol of hydroxyl number from 10 to 230, preferably 28 to 112, which is an addition product of ethylene oxide or of propylene oxide or of mixtures of both, and a diisocyanate reacted in amounts to provide an NCO:OH ratio from 1.2 to 2.5, and a second one of said prepolymers being a reaction product of a branched polyol of hydroxyl number from 10 to 570 which is an addition product of ethylene oxide or of propylene oxide or of mixtures of both, and a diisocyanate reacted in amounts to provide an NCO:OH ratio from 1.2 to 2.5.

3. An adhesive composition according to claim 1, wherein the prepolymer component comprises a polyetherurethane prepolymer which is a reaction product of a branched polyol of hydroxyl number from 10 to 570 which is an addition product of ethylene oxide or of propylene oxide or of mixtures of both, and a diisocyanate reacted in amounts to provide an NCO:OH ratio from 1.2 to 2.5, and which may be further reacted with a monofunctional alcohol so as to provide a prepolymer component having an NCO functionality between 2.0 and 3.0.

4. An adhesive composition according to claim 1 wherein the prepolymer component comprises a mixture of a polyisocyanate of low molecular weight having a functionality greater than 2 and a polyetherurethane prepolymer which is a reaction product of a linear polyol of hydroxyl number from 10 to 230, preferably 28 to 112, which is an addition product of ethylene oxide or of propylene oxide or of mixtures of both, and a diisocyanate reacted in amounts to provide an NCO:OH ratio from 1.2 to 2.5, the polyisocyanate and the prepolymer being mixed in a ratio such that the functionality of the prepolymer component lies between 2.0 and 3.0.

5. An adhesive composition according to claim 2, wherein the, or the first, prepolymer is a reaction product of the linear polyol and diisocyanate reacted in amounts to provide an NCO:OH ratio from 1.35 to 2.0.

6. An adhesive composition according to claim 4, wherein the, or the first, prepolymer is a reaction product of the linear polyol and diisocyanate reacted in amounts to provide an NCO:OH ratio from 1.35 to 2.0.

7. An adhesive composition according to claim 2, wherein the branched polyol has a hydroxyl number of 25 to 56 and a hydroxyl functionality from 2.8 to 3.0.

8. An adhesive composition according to claim 3, wherein the branched polyol has a hydroxyl number of 25 to 56 and a hydroxyl functionality from 2.8 to 3.0.

9. An adhesive composition according to claim 2, wherein the, or the second, prepolymer comprises a reaction product of a branched polyol and diisocyanate prepared from quantities of the reactants to provide an NCO:OH ratio from 1.8 to 2.2.

10. An adhesive composition according to claim 3, wherein the, or the second, prepolymer comprises a reaction product of a branched polyol and diisocyanate prepared from quantities of the reactants to provide an NCO:OH ratio from 1.8 to 2.2.

11. An adhesive composition according to claim 2, wherein the first and second prepolymers are present in amounts such that the ratio of NCO equivalents of the first prepolymer to NCO equivalents of the second prepolymer is in the range 1:2 to 10:1, preferably in the range 1.5:1 to 5:1.

12. An adhesive composition according to claim 3, wherein the monofunctional alcohol comprises 2-ethyl hexanol or a monohydroxy resin.

13. An adhesive composition according to claim 4, wherein the first prepolymer is admixed with polymethylene polyphenyl polyisocyanate.

14. An adhesive composition according to claim 2, comprising a tackifying resin of low acid number less than 5.

15. An adhesive according to claim 2, comprising a tackifying resin which is an indene containing resin or rosin ester present in an amount to provide 1 to 40% of the composition.

16. An adhesive composition according claim 2, comprising a plasticiser of low acid number.

17. An adhesive composition according to claim 2, comprising as a plasticiser of low acid number one or more phthalates or alkylsulphonates present in an amount to provide 0.5 to 10% by weight of the composition.

18. A method of forming a pressure-sensitive adhesive layer on a workpiece comprising applying to the workpiece a solvent-free mass of composition according to claim 1 at a viscosity in the range 10 to 100 PaS to provide a layer from 0.05 to 3 mm thick, and exposing the layer to a moist atmosphere having a relative humidity above 10% at a temperature in the range 20° C. to 120° C. whereby cross linking of the composition is effected.

* * * * *